(12) United States Patent
Kim et al.

(10) Patent No.: US 11,431,218 B2
(45) Date of Patent: Aug. 30, 2022

(54) MOTOR AND MANUFACTURING METHOD OF THE SAME

(71) Applicant: LG Electronics Inc., Seoul (KR)

(72) Inventors: Sunggi Kim, Seoul (KR); Byungjik Kim, Seoul (KR); Changlae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 283 days.

(21) Appl. No.: 16/549,583

(22) Filed: Aug. 23, 2019

(65) Prior Publication Data

US 2020/0067371 A1 Feb. 27, 2020

(30) Foreign Application Priority Data

Aug. 23, 2018 (KR) .................... 10-2018-0098539

(51) Int. Cl.
| | | |
|---|---|---|
| *H02K 7/14* | (2006.01) | |
| *H02K 5/167* | (2006.01) | |
| *H02K 5/173* | (2006.01) | |
| *H02K 7/08* | (2006.01) | |
| *H02K 15/14* | (2006.01) | |
| *F16C 32/06* | (2006.01) | |
| *A47L 9/22* | (2006.01) | |

(52) U.S. Cl.
CPC ....... *H02K 5/1675* (2013.01); *F16C 32/0614* (2013.01); *H02K 5/1735* (2013.01); *H02K 7/085* (2013.01); *H02K 7/14* (2013.01); *H02K 15/14* (2013.01); *A47L 9/22* (2013.01); *F16C 2380/26* (2013.01)

(58) Field of Classification Search
CPC .... H02K 5/1675; H02K 5/1735; H02K 7/085; H02K 7/14; H02K 15/14; F16C 32/0614; F16C 2380/26; A47L 9/22
USPC ......................................................... 310/90
See application file for complete search history.

(56) References Cited

U.S. PATENT DOCUMENTS 4,701,651 A 10/1987 Tanaka
5,059,038 A 10/1991 Domes
(Continued)

FOREIGN PATENT DOCUMENTS

CN 203743223 7/2014
JP S58-192455 11/1983
(Continued)

OTHER PUBLICATIONS

Taiwan Office Action in Taiwan Appln. No. 10920527000, dated Jun. 3, 2020, 4 pages (with English translation).
(Continued)

*Primary Examiner* — Terrance L Kenerly
(74) *Attorney, Agent, or Firm* — Fish & Richardson P.C.

(57) ABSTRACT

A motor according to an embodiment of the present invention includes a rotary shaft; a rotor mounted on the rotary shaft; a stator surrounding an outer periphery of the rotor; an impeller mounted on the rotary shaft to be spaced apart from the rotor; a bearing housing positioned between the impeller and the rotor and formed with a through-hole through which the rotary shaft passes; and a gas bearing disposed in the bearing housing, wherein a thickness of the gas bearing is equal to or greater than 50% of a gap between an inner surface of the bearing housing and an outer peripheral surface of the rotary shaft and is equal to or less than 0.3 mm.

20 Claims, 9 Drawing Sheets

(56) References Cited

U.S. PATENT DOCUMENTS

| | | | |
|---|---|---|---|
| 5,477,092 | A | 12/1995 | Tarrant |
| 6,945,697 | B2 | 9/2005 | Schuster |
| 7,259,486 | B2 | 8/2007 | Yamamoto |
| 7,908,737 | B2 | 3/2011 | Kudou et al. |
| 2005/0100254 | A1 | 5/2005 | Schuster |
| 2006/0250039 | A1 | 11/2006 | Yamamoto |
| 2010/0215491 | A1 | 8/2010 | Mockridge et al. |
| 2018/0073557 | A1 | 3/2018 | Hwang et al. |

FOREIGN PATENT DOCUMENTS

| | | | | |
|---|---|---|---|---|
| JP | H0571538 | | 3/1993 | |
| JP | H05071538 | | 3/1993 | |
| JP | 2006162029 | | 6/2006 | |
| JP | 2006322451 | | 11/2006 | |
| JP | 2013256884 | | 12/2013 | |
| KR | 1998-0079398 | | 11/1998 | |
| KR | 101004701 | B1 * | 1/2011 | ........... F04D 29/056 |
| KR | 101633673 | B1 * | 6/2016 | .............. F16C 27/04 |
| TW | 494190 | | 7/2002 | |

OTHER PUBLICATIONS

Extended European Search Report in European Application No. 19188344.6, dated Dec. 11, 2019, 2 pages.
Extended European Search Report in European Appln. No. 21170657.7, dated Sep. 24, 2021, 5 pages.
Office Action in Australian Appln. No. 2021203600, dated Jun. 14, 2022, 3 pages.

\* cited by examiner

MOTOR AND MANUFACTURING METHOD OF THE SAME

CROSS-REFERENCE TO RELATED APPLICATION

This application claims the benefit of priority to Korean Patent Application No. 10-2018-0098539, filed in the Korean Intellectual Property Office on Aug. 23, 2018 under 35 U.S.C. 119 and/or 35 U.S.C. 120, the entire contents of which are incorporated herein by reference.

BACKGROUND OF THE INVENTION

1. Field of the Invention

The present invention relates to a motor, and more particularly, to a motor having a bearing and a method of manufacturing the same.

2. Discussion of the Related Art

A motor may be mounted in a home appliance such as a vacuum cleaner, and in this case, generate a driving force for sucking air into a dust collecting portion.

An example of such a motor may include a motor housing, a stator disposed in the motor housing, a rotor rotated by the stator, and a rotary shaft on which the rotor is mounted. The rotary shaft of the motor may be rotatably supported by at least one bearing, and the rotary shaft may be rotated at a high speed while being supported by the bearing.

A motor may include a rotor assembly in which a rotor is coupled to a bearing cartridge and an impeller, and an example of such a rotor assembly is disclosed in disclosed in U.S. Publication No. 2010/0215491 A1 (published Aug. 26, 2010).

In the rotor assembly disclosed in the above-mentioned prior art, a pair of bearings are surrounded by a sleeve, and a spring is disposed between the pair of bearings in order to support a rotary shaft at two points.

SUMMARY OF THE INVENTION

An object of the present invention is to provide a motor capable of reducing the size and weight of a bearing and minimizing the dispersion of a bearing clearance.

A motor according to an embodiment of the present invention is provided with a gas bearing for supporting a rotary shaft mounted in a bearing housing, wherein the thickness of the gas bearing maybe equal to or greater than 50% of a gap between an inner surface of the bearing housing and an outer peripheral surface of the rotary shaft, and may be equal to or less than 0.3 mm.

When the gas bearing having the above-mentioned thickness is applied to a high-speed small-sized motor of which the rotary shaft is capable of being rotated at tens of thousands of rpm or more, the life of the high-speed small-sized motor may be prolonged, and such a motor may be downsized and lightweight.

Further, since the thickness of the gas bearing is equal to or less than 0.3 mm, dispersion of the bearing clearance may be minimized, and gas such as air may support the rotary shaft with high reliability.

When the thickness of the gas bearing exceeds 0.3 mm, a part of the gas bearing may be subjected to plastic deformation and the shape thereof may be deformed when the gas bearing is bent to be mounted on the bearing housing. When the thickness of the gas bearing is equal to or less than 0.3 mm, the plastic deformation of the gas bearing may be minimized and the malfunction that may be caused in the plastic deformation of the gas bearing may be minimized.

Further, in the present embodiment, since the thickness of the gas bearing is equal to or greater than 50% of the gap between the inner surface of the bearing housing and the outer peripheral surface of the rotary shaft, parts of the gas bearing does not overlap each other radially when the gas bearing is mounted in the bearing housing. That is, the present embodiment may prevent a malfunction that may be caused when parts of the gas bearing overlap each other in the radial direction.

To this end, the thickness of the gas bearing may be equal to or greater than 0.1 mm.

The gas bearing may include a metal body having a major arc shape in cross section, and a coating layer coated on the inner surface of the metal body. The rotary shaft may include a gas bearing facing portion that faces the coating layer in the radial direction. A bearing clearance in which gas such as air is capable of lifting the rotary shaft may be formed between the gas bearing facing portion and the coating layer.

When an outer diameter of the gas bearing facing portion is in a range of from 4 mm to 5 mm, the bearing clearance smoothly functioning as the gas bearing may be in a range of from 0.02 mm to 0.05 mm.

The thickness of the bearing in the present embodiment is a thickness that may prevent dispersion of the bearing clearance from becoming large.

In other words, according to the motor of the present embodiment, since the dispersion of the bearing clearance is not large, gas such as air may support the rotary shaft with high reliability even when the rotary shaft rotates at a high speed.

The metal body is preferably made of a metal having good abrasion resistance, and a preferable example thereof is a nickel chromium alloy having a nickel content greater than a chromium content.

The bearing housing may be provided with a first retaining jaw protruding such that an end of the gas bearing in an axial direction is retained, and a second retaining jaw protruding such that the other end of the gas bearing in the axial direction is retained.

The gas bearing is restrained in the axial direction by the first retaining jaw and the second retaining jaw and therefore, the gas bearing may not be easily detached from the bearing housing and may be held in the bearing housing with high reliability.

The protrusion width of each of the first and second retaining jaws may be thinner than the thickness of the gas bearing. In this case, the damage to the first and second retaining jaws due to the rotary shaft may be minimized.

The appropriate protrusion width of each of the first and second retaining jaws may be in a range of from 50% to 90% of the thickness of the gas bearing.

The axial length of the gas bearing may be shorter than a spacing distance between the first and second retaining jaws. In this case, the radial pushing of a part of the gas bearing may be minimized, and a bearing distance between the gas bearing and the rotary shaft may be managed to be as uniform as possible.

The gas bearing may have a long slit in an axial direction, where the long slit is open in a radial direction. The gas bearing may be easily contracted and restored by the slit when being mounted, and operation for mounting the gas bearings may be facilitated.

Further, the motor may further include a rolling bearing disposed to be spaced apart from the gas bearing to support the rotary shaft. The rolling bearing supports the rotary shaft in cooperation with the gas bearing, thereby stably supporting the rotary shaft as compared with as a case where the rotary shaft is supported by the gas bearing alone. The gas bearing and the rolling bearing are supported on one bearing housing together, so that the structure of the motor may be simplified.

The thickness of the gas bearing is thinner than the thickness of an inner race of the rolling bearing, and therefore it is possible to reduce a weight as compared with a case where the pair of rolling bearings support the rotary shaft.

The axial length of the gas bearing is longer than the axial length of the rolling bearing, allowing a gas such as air to reliably lift the rotary shaft between the gas bearing and the rotary shaft.

According to an embodiment of the present invention, a method of manufacturing a motor includes applying a coating layer to one surface of a metal body with a plate shape; forming a gas bearing by rolling the metal body in an arc shape such that the one surface with the coating layer is positioned inside; inserting the gas bearing into a gas bearing housing portion formed in a bearing housing; and passing a rotary shaft through inside of the gas bearing, wherein a thickness of the gas bearing is equal to or greater than 50% of a gap between an inner surface of the bearing housing and an outer peripheral surface of the rotary shaft.

The thickness of the gas bearing is equal to or greater than 0.1 mm.

The metal body is made of nickel chromium alloy in which a nickel content is greater than a chromium content.

According to the embodiment of the present invention, since the thickness of the gas bearing is equal to or less than 0.3 mm, it is possible to manufacture the gas bearing to minimize the thickness dispersion of the gas bearing. Since the thickness of the gas bearing is equal to or greater than 50% of the gap between the inner surface of the bearing housing and the outer peripheral surface of the rotary shaft, it is possible to minimize overlapping of parts of the gas bearing in the radial direction between the bearing housing and the rotary shaft and to prevent malfunction of the gas bearing.

Further, the gas bearing may be reduced in weight, and the material cost of the gas bearing may be reduced.

Further, the gas bearing is retained in the first and second retaining jaws in the axial direction, thereby enabling the gas bearing to be stably held without any removal from the bearing housing.

DETAILED DESCRIPTION OF THE PREFERRED EMBODIMENTS

Hereinafter, specific embodiments of the present invention will be described in detail with reference to the drawings.

Figure 1:
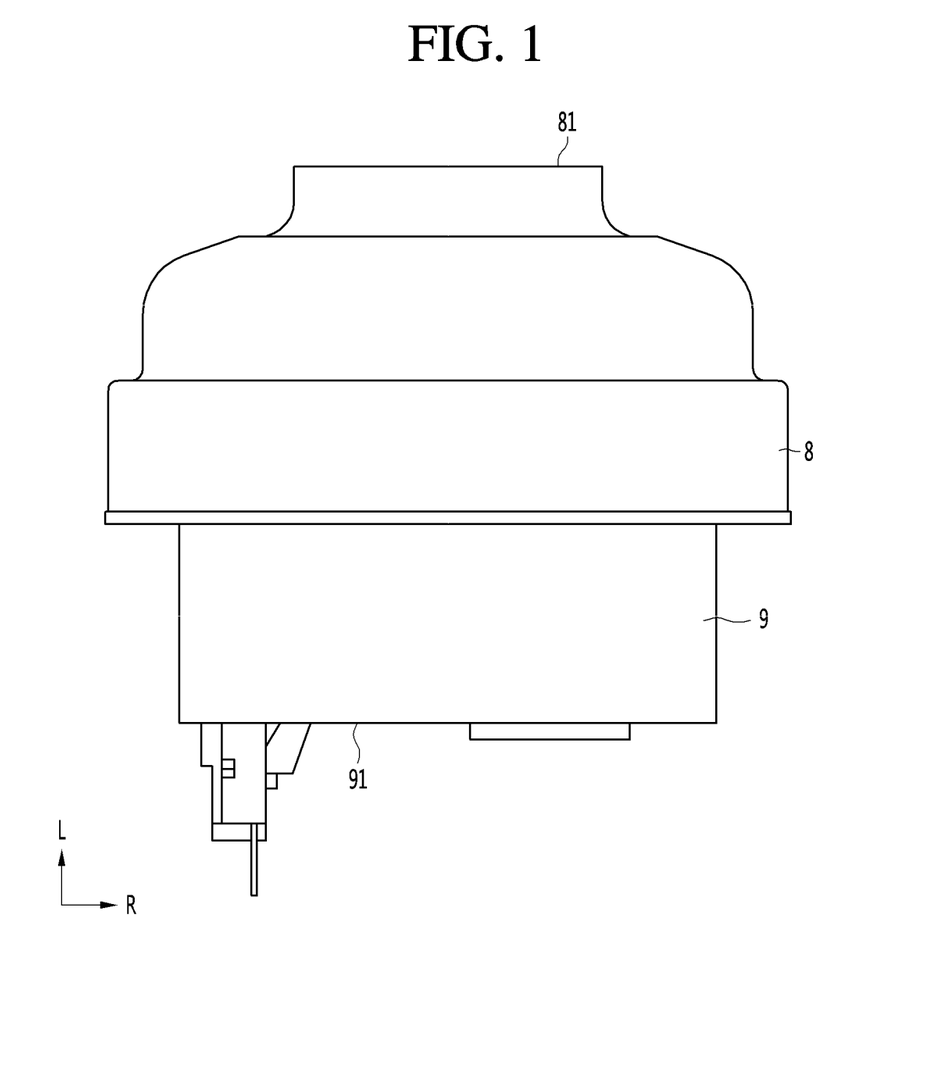
FIG. 1 is a side view of a motor according to an embodiment of the present invention.
Figure 2:
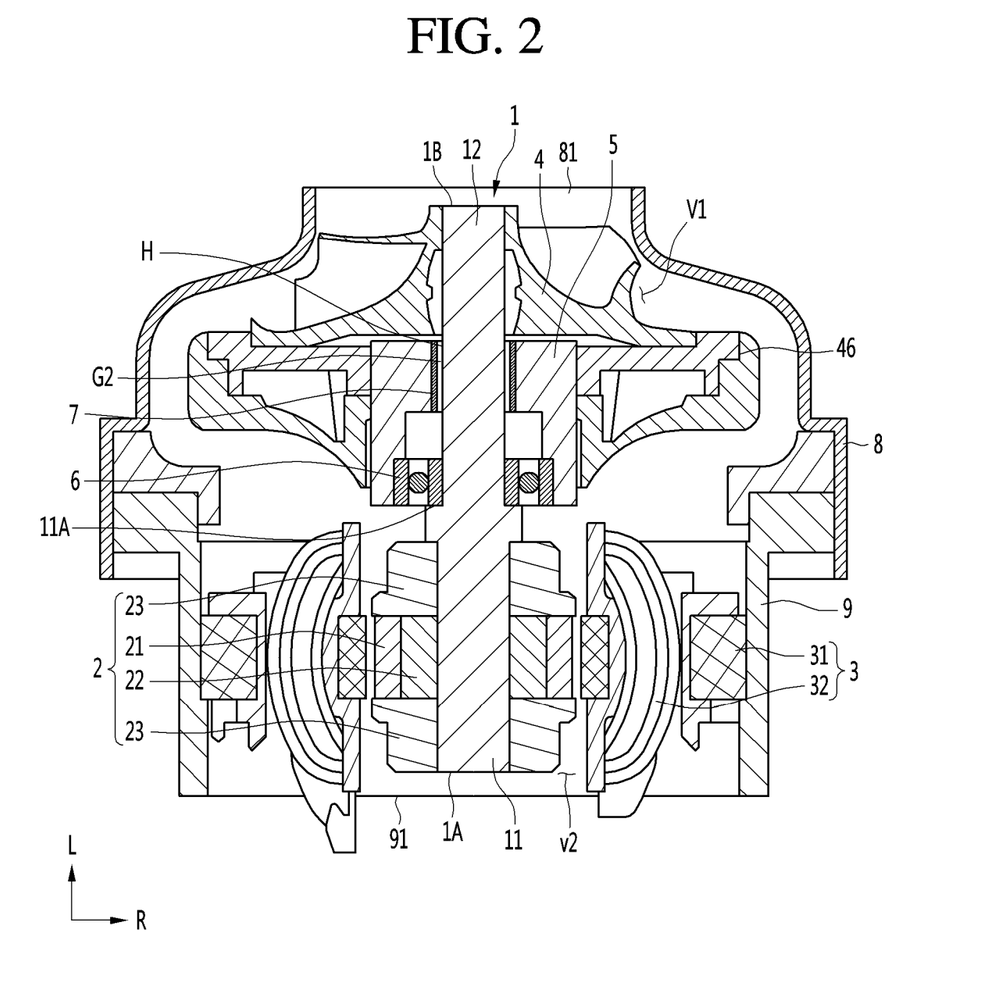
FIG. 2 is a cross-sectional view of a motor according to an embodiment of the present invention.
Figure 3:
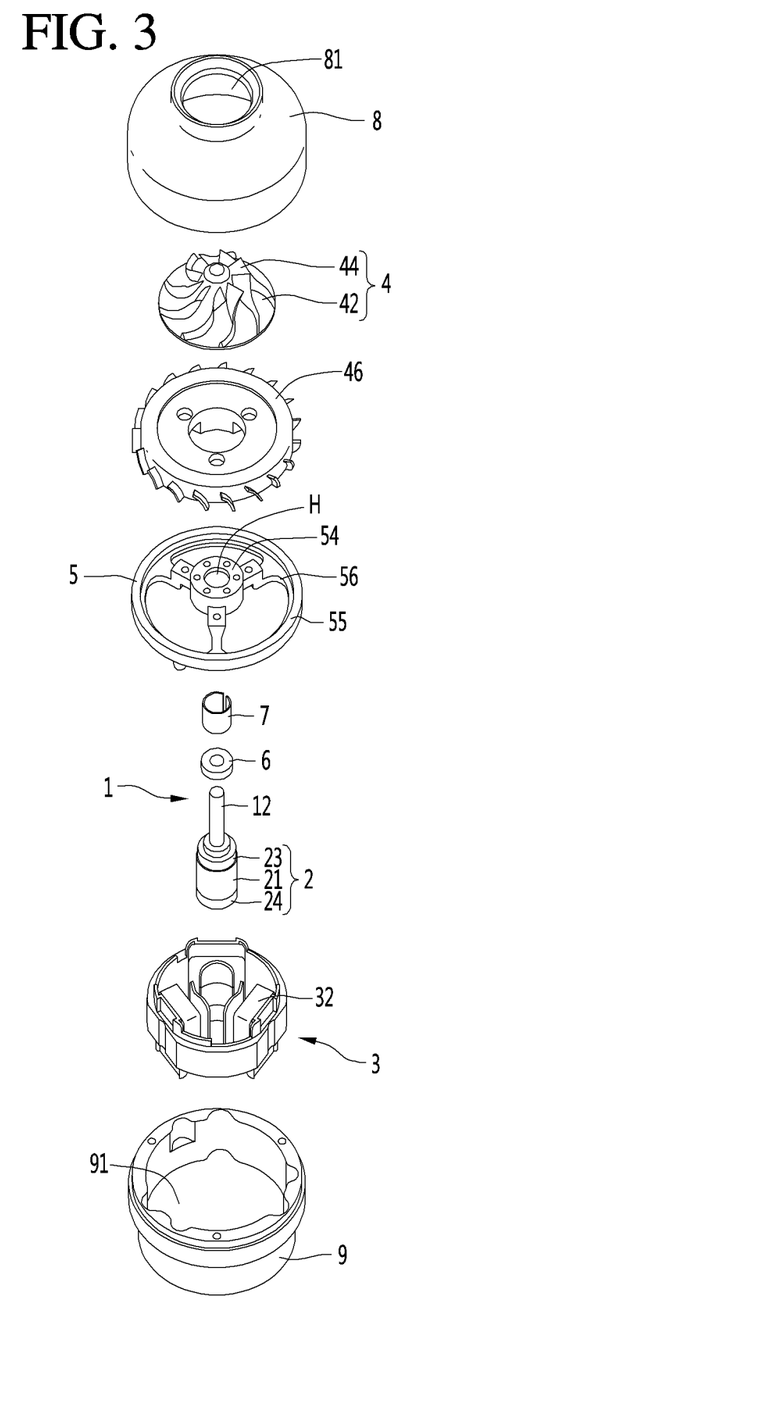
FIG. 3 is an exploded perspective view of a motor according to an embodiment of the present invention.
Figure 4:
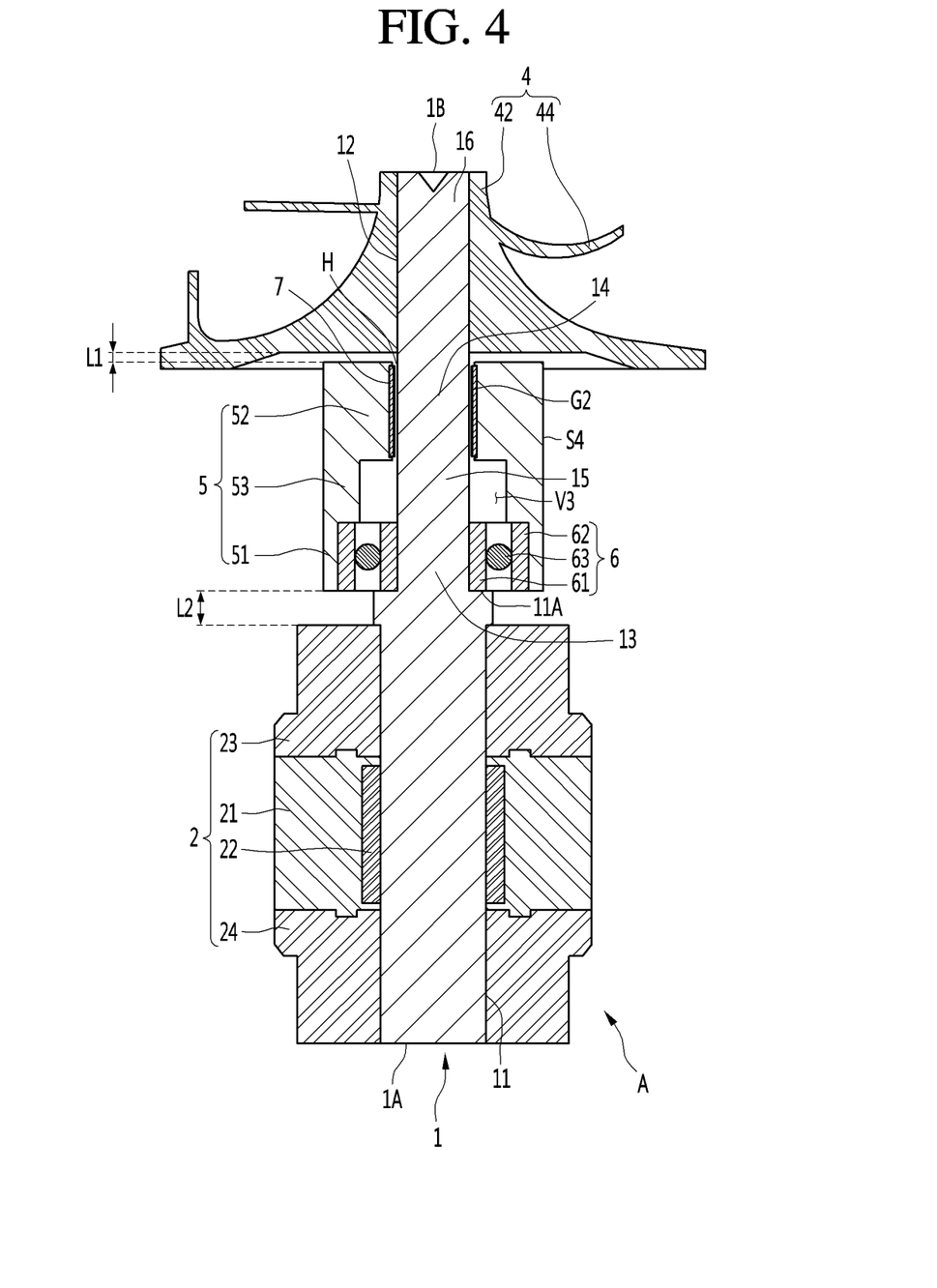
FIG. 4 is a cross-sectional view of a rotor assembly according to an embodiment of the present invention.
Figure 5:
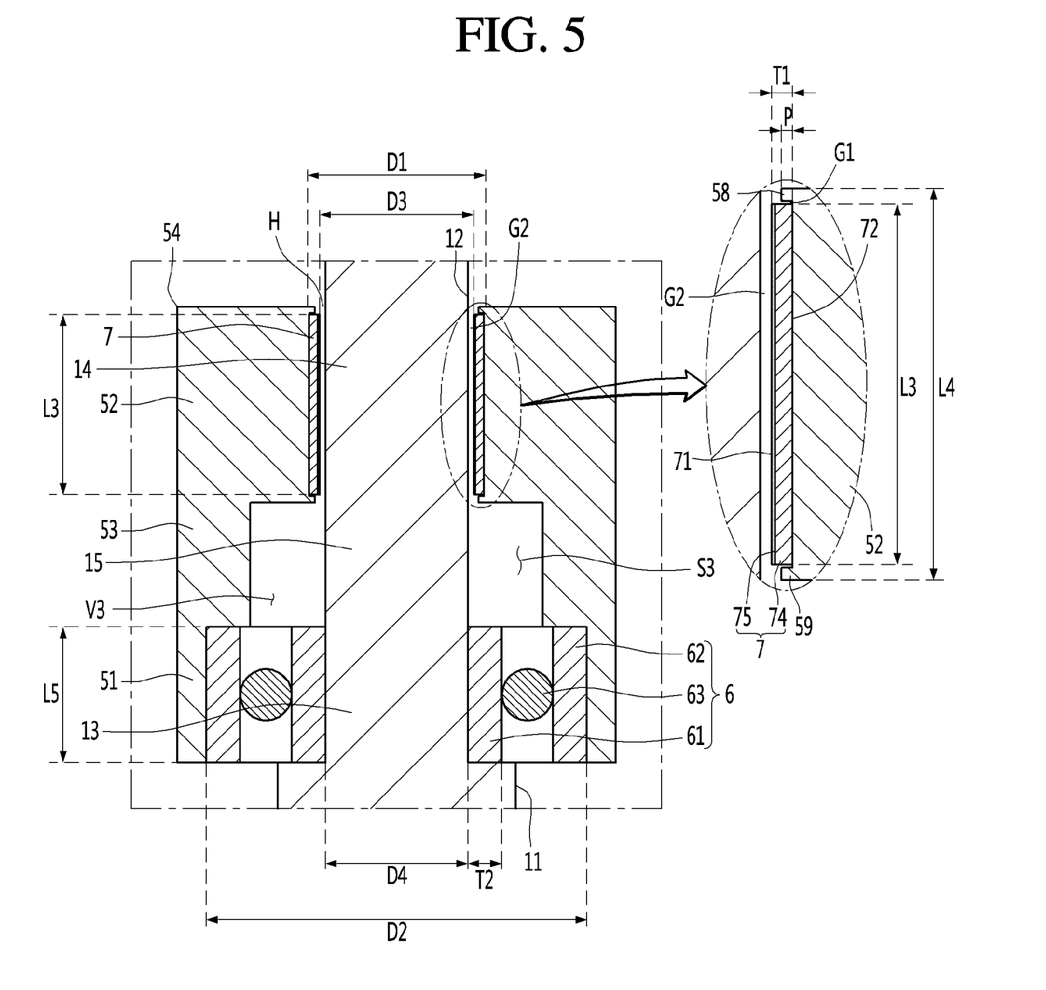
FIG. 5 is an enlarged cross-sectional view of a rolling bearing, a gas bearing, and a bearing housing according to an embodiment of the present invention.
Figure 6:
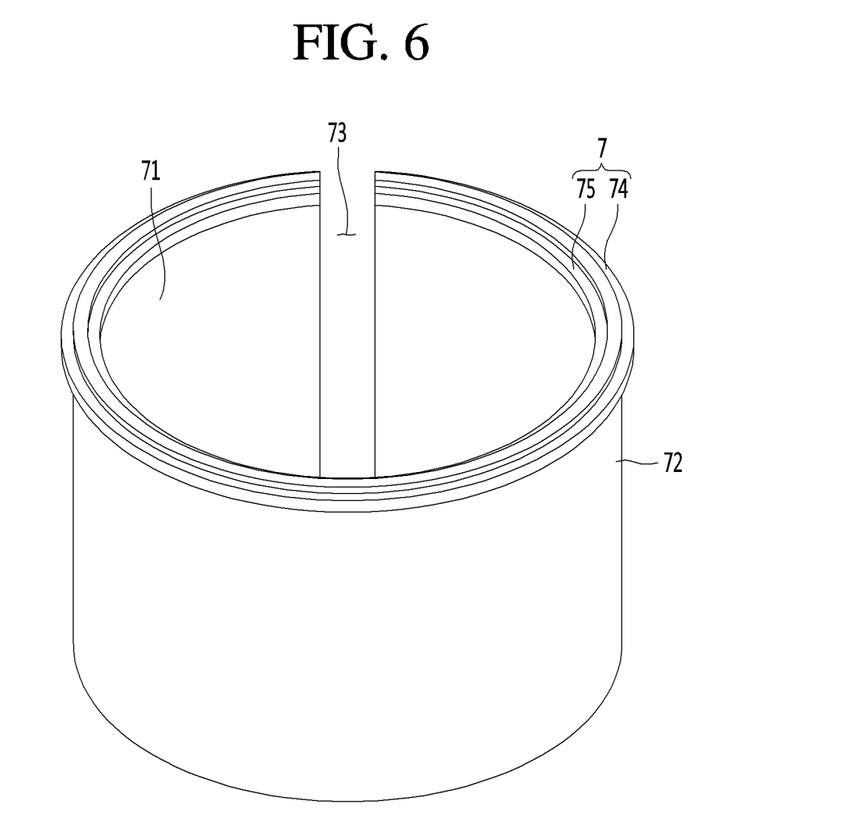
FIG. 6 is an enlarged perspective view showing a gas bearing according to an embodiment of the present invention.
Figure 7:
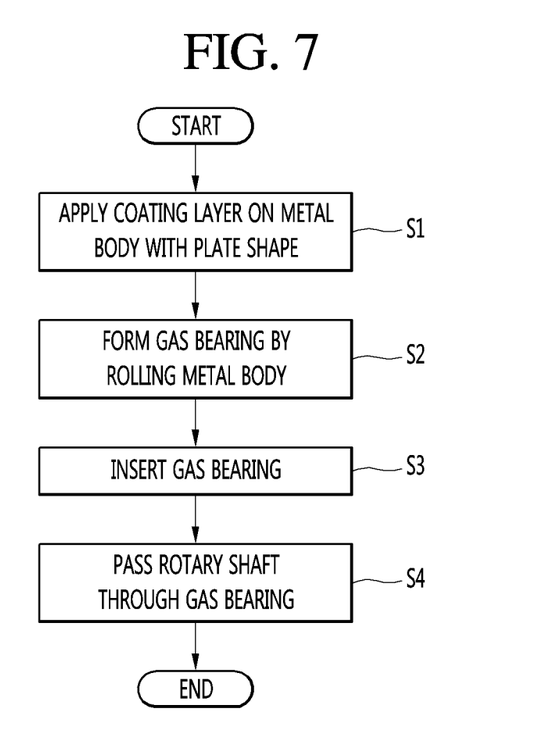
FIG. 7 is a flowchart of a method of manufacturing a motor according to an embodiment of the present invention.

FIG. 1 is a side view of a motor according to an embodiment of the present invention, FIG. 2 is a cross-sectional view of a motor according to an embodiment of the present invention;

FIG. 3 is an exploded perspective view of a motor according to an embodiment of the present invention, FIG. 4 is a cross-sectional view of a rotor assembly according to an embodiment of the present invention, FIG. 5 is an enlarged cross-sectional view of a rolling bearing, a gas bearing, and a bearing housing according to an embodiment of the present invention, and FIG. 6 is an enlarged perspective view showing a gas bearing according to an embodiment of the present invention. FIG. 7 is a flowchart of a method of manufacturing a motor according to an embodiment of the present invention.

A motor may include a rotary shaft 1, a rotor 2, a stator 3, an impeller 4, a bearing housing 5, and a gas bearing 7. The motor may further include a rolling bearing 6 spaced apart from the gas bearing 7. The motor may further include motor body 8 and 9 which form its appearance.

An impeller space V1 in which the impeller 4 is accommodated may be formed inside the motor body 8 and 9. A motor space V2 in which the rotor 2 and the stator 3 are accommodated may be formed inside the motor body 8 and 9.

The motor body 8 and 9 may be provided with a suction port 81 through which air is sucked into the impeller space V1. The motor body 8 and 9 may be provided with a discharge port 91 through which the air in the motor space V2 is discharged to the outside of the motor.

The motor body 8 and 9 may be formed of a single member or may be formed of a combination of a plurality of members.

When the motor body 8 and 9 is a combination of a plurality of members, the motor body 8 and 9 may include an inlet body 8 and a motor housing 9.

The inlet body 8 may be formed with a suction port 81 through which air is sucked. The inlet body 8 may be disposed to surround the outer periphery of the impeller 4. The impeller space V1 in which the impeller 4 is rotatably accommodated may be formed in the inlet body 8.

The inlet body 8 may be engaged with the motor housing 9 on the opposite side of the suction port 81. The inlet body 8 may surround the whole or a part of an outer periphery of the motor housing 9.

The motor housing 9 may surround an outer periphery of the stator 3. The motor space V2 in which the rotary shaft 1, the rotor 2 and the stator 3 are accommodated may be formed inside the motor housing 9. The motor housing 9 may be formed with a discharge port 91. Air that has flowed into the motor space V2 after flowing through the impeller 4 may be discharged to the outside of the motor body 8 and 9 through the discharge port 91. The discharge port 91 may be formed on the opposite side of the suction port 51.

The motor housing 9 may be hollow. In the motor, the rotary shaft 1 may not be directly supported on the motor housing 9 and the motor housing 9 may not include a rotary shaft supporter for the supporting the rotary shaft 1 directly.

The rotary shaft 1 may is elongated from the motor space V2 to the impeller space V1. One end 1A of the rotary shaft 1 may be disposed in the motor space V2 and the other end 1B of the rotary shaft 1 may be disposed in the impeller space V2.

A portion between one end 1A and the other end 1B of the rotary shaft 1 may be supported by a plurality of bearings 6 and 7. Each of the one end 1A and the other end 1B may be a free end which is not supported by the motor body 8 and 9.

The one end 1A of the rotary shaft 1 may be close to the rotor 2 among the rotor 2 and the impeller 4 and may be a rotor-side free end.

The other end 1B of the rotary shaft 1 may be closer to the impeller 4 among the rotor 2 and the impeller 4 and may be an impeller-side fee end.

The rotary shaft 1 may include a large diameter portion 11 and a small diameter portion 12. The large diameter portion 11 and the small diameter portion 12 may be continuous in an axial direction L.

The large diameter portion 11 is a portion on which the rotor 2 is mounted, and its outer diameter may be larger than an outer diameter of the small diameter portion 12. The large diameter portion 11 may include the one end 1A of the rotary shaft 1. The large diameter portion 11 may be positioned in the motor space V2.

An outer diameter of one end 11A of the large diameter portion 11 in the axial direction may be larger than an inner diameter of an inner race 61 of the rolling bearing 6. In this case, the inner race 61 of the rolling bearing 6 may be caught in the one end 11A of the large diameter portion 11 in the axial direction L. The one end 11A of the large diameter portion 11 in the axial direction may be brought into contact with the inner race 61 of the rolling bearing 6 and the rolling bearing 6 is caught by the one end 11A of the large diameter portion 11 in the axial direction not to slip toward the rotor 2.

The small diameter portion 12 may axially extend from one end 11A of the large diameter portion 11 in the longitudinal direction. The small diameter portion 12 may pass through a through-hole H of the bearing housing 5.

The small diameter portion 12 may be a portion on the impeller 4 and the rolling bearing 6 are mounted. The small diameter portion 12 may include the other end 1B of the rotary shaft 1. The whole or a part of the small diameter portion 12 may be positioned in the impeller space V1.

The small diameter portion 12 may face the rolling bearing 6 and the gas bearing 7 in the radial direction R, respectively.

The small diameter portion 12 may include an inner race contact portion 13 with which the inner race 61 of the rolling bearing 6 is in contact and a gas bearing facing portion 14 which faces the gas bearing 7 in the radial direction. Herein, the gas bearing facing portion 14 may be a portion facing a coating layer 75 of the gas bearing 7.

In this case, the outer diameter of the inner race contact portion 13 may be equal to the outer diameter of the gas bearing facing portion 14.

A manufacturing process of the rotary shaft 1 may be complicated when the inner race contact portion 13 is stepped from the gas bearing facing portion 14. When the outer diameter of the inner race contact portion 13 is equal to the outer diameter of the gas bearing facing portion 14, the manufacturing process of the rotary shaft 1 may be simplified.

The small diameter portion 12 may further include a connection portion facing portion 15 which faces a connection portion 53 in the radial direction L. An empty space V3 may be formed between an outer peripheral surface of the connection portion facing portion 15 and an inner peripheral surface of the connection portion 53. The empty space V3 may function as a passage for air flowing into and out a bearing clearance G2 between the inner peripheral surface of the gas bearing 7 and the outer peripheral surface of the rotary shaft 1.

On the other hand, the small diameter portion 12 may further include an impeller coupling portion 16 to which the impeller 4 is coupled.

The outer diameter of the small diameter portion 12 may be constant from the inner race contact portion 13 to the impeller coupling portion 16. In this case, the manufacturing process of the rotary shaft 1 may be simplified.

The rotor 2 may be mounted on the rotary shaft 1. The rotor 2 may be disposed to surround the outer periphery of the rotary shaft 1. The rotor 2 may be axially spaced apart from the gas bearing 7. The rotor 2 may be axially spaced from the rolling bearing 6. The rotor 2 may be mounted on a portion of the rotary shaft 1 which is accommodated in the motor space V2.

The rotor 2 may include a magnet 21. The rotor 2 may further include a magnet core 22 on which the magnet 21 is mounted. The rotor 2 may further include a pair of end plates 23 and 24 spaced apart from each other in the axial direction L.

The rotor 2 may constitute a rotor assembly A together with the rotary shaft 1, the impeller 4 and the rolling bearing 6. The rotor 2 may be heavier than the impeller 4. A center of gravity of the rotor assembly A may be closer to the rotor 2 among the impeller 4 and the rotor 2.

The stator 3 may be disposed to surround the outer periphery of the rotor 2. The stator 3 may be disposed on an inner periphery of the motor body 8 and 9. The stator 3 may be disposed on an inner periphery of the motor housing 9. The stator 3 may include a stator core 31 and a coil 32 wound around the stator core 31.

The impeller 4 may be mounted on the rotary shaft 1 to be spaced apart from the rotor 2. The impeller 4 may be mounted on the rotary shaft 1 to be spaced apart from the gas bearing 7. The impeller 4 may be spaced apart from the gas bearing 7 in the axial direction L.

The impeller 4 may be made of a material that is lighter than that of the rotor 2 and formed of a high strength synthetic resin material such as PEEK.

The impeller 4 may be a centrifugal impeller that sucks gas such as air in the axial direction L and discharges it in the centrifugal direction. The impeller 4 may include a hub 42 and a plurality of blades 44 formed on outer periphery of the hub 42.

The motor may further include a diffuser 46 for guiding air that has flowed from the impeller 4. The diffuser 46 may be positioned inside the inlet body 8 and its outer periphery may face an inner peripheral surface of the inlet body 8.

A passage for guiding gas such as air that has flowed by the impeller 4 to the motor space V2 may be formed between the diffuser 46 and the inlet body 8.

The bearing housing 5 may be positioned between the impeller 4 and the rotor 1. The through-hole H through which the rotary shaft 1 passes may be formed in the bearing housing 5. The bearing housing 5 may surround a part of the outer periphery of the rotary shaft 1. The baying housing 5 may surround a part of the outer periphery of the small diameter portion 12 of the rotary shaft 1.

The bearing housing 5 may be integrally formed with the motor body 8 and 9 and may be formed as a part of the motor body 8 and 9.

Meanwhile, the bearing housing 5 may be separately manufactured from the motor body 8 and 9 and then coupled to the motor body 8 and 9. When the bearing housing 5 is manufactured separately from the motor body 8 and 9, the bearing housing 5 may be fastened to the inlet body 8 or the motor housing 9 with a fastening member such as a screw.

The bearing housing 5 may include a housing portion 54 on which the gas bearing 7 is supported. The bearing housing 5 may further include a fastening portion 55 fastened to the motor body 8 and 9. The bearing housing 5 may further include a plurality of bridge portions 56 connecting the housing portion 54 and the fastening portion 55.

The through-hole H through which the rotary shaft 1 passes may be formed in the housing portion 54. A gas bearing space in which the gas bearing 7 is accommodated may be formed inside the housing portion 54.

The motor may include a contact bearing that is always in contact with the rotary shaft 1 and a non-contact bearing that is not always in contact with the rotary shaft 1 and the rotary shaft 1 may be supported by a combination of the contact bearing and the non-contact bearing.

In the motor, a portion of the rotary shaft 1 positioned between the rotor 2 and the impeller 4 may be supported by the gas bearing 7, which is an example of a non-contact bearing, and the rolling bearing 6, which is an example of a contact bearing. In this case, the rolling bearing 6 may be mounted with the gas bearings 7 in the bearing housing 5 in which the gas bearing 7 is accommodated. The rolling bearing 6 may be disposed in the bearing housing 5 to be spaced apart from the gas bearing 7 to support the rotary shaft 1.

The bearing housing 5 may include a gas bearing housing portion 52 on which the gas bearing 7 is supported.

The gas bearing housing portion 52 may surround the outer peripheral surface of the gas bearing 7 and support and protect the gas bearing 7. The gas bearing housing portion 52 may face the impeller 4 in the axial direction L. The gas bearing housing portion 52 may be axially spaced apart from the impeller 4 and a gap through which a gap such as air is introduced and discharged into the inside of the gas bearing housing portion 52 is formed between the gas bearing housing portion 52 and the impeller 4. The gap may communicate with the bearing clearance between the gas bearing 7 and the rotary shaft 1 in the axial direction L.

A first retaining jaw 58 in which one end of the gas bearing 7 in the axial direction is retained may protrude from the bearing housing 5 and a second retaining jaw 59 in which the other end of the gas bearing 7 in the axial direction is retained may protrude from the bearing housing 5.

The first retaining jaw 58 and the second retaining jaw 59 may protrude with a width not to be worn by the rotary shaft 1 and may protrude with a width not to be in contact with the rotary shaft 1. The protrusion width P of each of the first retaining jaw 58 and the second retaining jaw 59 may be thinner than a thickness T1 of the gas bearing 7. In this case, the outer peripheral surface of the rotary shaft 1 may be brought into contact with the coating layer 75 of the gas bearing 7, and contact of the rotary shaft 1 with the first retaining jaw 58 and the second retaining jaw 59 may be minimized.

The protrusion width P of each of the first retaining jaw 58 and the second retaining jaw 59 may be in a range of from 50% to 90% of the thickness T1 of the gas bearing 7. When the protrusion width P of the first retaining jaw 58 and the second retaining jaw 59 is too small, the gas bearing 7 may easily escape to the outside of the bearing housing 5 while passing over any one of the first retaining jaw 58 and the second retaining jaw 59.

On the other hand, when the protrusion width P of each of the first and second retaining jaws 58 and 59 is in the range of from 50% to 90% of the thickness T1 of the gas bearing 7, the gas bearing 7 may be stably supported and held between the first retaining jaw 58 and the second retaining jaw 59 in the axial direction L.

The bearing housing 5 may further include a rolling bearing housing portion 51 on which the rolling bearing 6 is supported.

The rolling bearing housing portion 51 may surround the outer peripheral surface of the rolling bearing 6 and may support and protect the rolling bearing 6. The rolling bearing housing portion 51 may face the rotor 2 in the axial direction L.

An outer race 62 of the rolling bearing 6 may be press-fitted into and then in close contact with the inner peripheral surface of the rolling bearing housing portion 51 and may be fixed to the inner peripheral surface of the rolling bearing housing portion 51. The rolling bearing housing portion 51 may have an inner diameter larger than that of the gas bearing housing portion 52.

When the bearing housing 5 includes both the rolling bearing housing portion 51 and the gas bearing housing portion 52, the bearing housing 5 may further include the connection portion 53 connecting the rolling bearing housing portion 51 and the gas bearing housing portion 52.

The connection portion 53 may be formed such that the outer race 62 of the rolling bearing 6 is retained in the axial direction L. The inner diameter of the connection portion 53 may be smaller than the outer diameter of the outer race 62 of the rolling bearing 6. The inner diameter of the connection portion 53 may be smaller than the inner diameter of the rolling bearing housing portion 51 and larger than the inner diameter of the gas bearing housing portion 52.

The empty space V3 may be formed between the inner periphery of the connection portion 53 and the outer peripheral surface of the rotary shaft 1. The empty space V3 may communicate with the bearing clearance G2 between the gas bearing 7 and the rotary shaft 1 in the axial direction L.

The rolling bearing housing portion 51, the gas bearing housing portion 52 and the connection part 53 may constitute a housing portion 54 that supports the rolling bearing 6 and the gas bearing 7 which are different in kind from each other.

A separate air passage for guiding a part of the air flowing by the impeller 4 to the bearing clearance G2 may be formed in the housing portion 54. An example of such an air passage may be formed such that the outer side of the housing portion 54 communicates with the space V3 of the connection portion 53 or may be formed such that the outside of the housing portion 54 communicates with the inside of the gas bearing housing portion 52.

The rolling bearings 6 and the gas bearings 7 may be disposed in the bearing housing 5. The rolling bearing 6 and the gas bearing 7 may be disposed in the axial direction L to be spaced apart from each other.

The rolling bearing 6 may be positioned between the gas bearing 7 and the rotor 2 in the axial direction L. The gas bearing 7 may be positioned between the rolling bearing 6 and the impeller 4 in the axial direction L.

The rotor 2, the impeller 4, the rolling bearing 6, and the gas bearing 7 may be disposed in the order of the rotor 2, the rolling bearing 6, the gas bearing 7 and the impeller 4 in the axial direction L.

The rolling bearing 6 may include the inner race 61 fixed to the rotary shaft 1, the outer race 62, and a rolling member 63.

The rolling bearing 6 may be a contact bearing that supports the rotary shaft 1 in a state of being always in contact with the rotary shaft 1 and may have a higher load bearing capacity than the gas bearing 7.

The rotary shaft 1, the rotor 2, and the rolling bearing 6 may be a rotor assembly A that is rotated integrally, and It is preferable that the rolling bearing 6 having a higher load bearing capacity and being always in contact with the rotary shaft 1 is closer to the rotor 2 among the rolling bearing 6 and the gas bearing 7.

The rolling bearing 6 may be closer to the rotor 2 than the impeller 4. When the rotor 3 and the impeller 4 are mounted on the rotary shaft 1, the center of gravity of the assembly A of the rotary shaft 1, the rotor 3 and the impeller 4 may be closer to the rotor 3 than the impeller 4.

It is preferable that the rolling bearing 6 having a load bearing capacity higher than that of the gas bearing 7 supports a portion located at the center of gravity of the rotor assembly A or a portion closest to the center of gravity as much as possible.

The rolling bearing 6 may be retained in one end 11A of the large diameter portion 11 in the axial direction L. The inner race 61 of the rolling bearing 6 may be retained by being in contact with the one end 11A of the large diameter portion 11.

The gas bearing 7 may be disposed in the bearing housing 5.

The gas bearing 7 may be an oilless bearing. The gas bearing 7 may be a gas bearing having a low friction coating layer formed on its inner periphery, which has excellent lubricity and abrasion resistance. Gas such as air in a space between the low friction coating layer of the gas bearing 7 and the outer peripheral surface of the rotary shaft 1 may support the rotary shaft 1. The gas bearing 7 may be a kinetic pressure gas bearing and may support the rotary shaft 1 by the gas such as air introduced into the space between the inner peripheral surface of the gas bearing 7 and the outer peripheral surface of the rotary shaft 1 in the vicinity thereof.

When the rotary shaft 1 is rotated, a velocity component of an air flow is generated around the outer periphery of the rotary shaft 1, and the rotary shaft 1 may be positioned eccentrically toward one side of the gas bearing 7. When the rotary shaft 1 is eccentric, a gap narrower than the bearing clearance in a case where the rotary shaft 1 is not eccentric is formed between the rotary shaft 1 and the gas bearing 7, gas such as air is sucked toward such a narrow gap and air outside the gas bearing 7 may be sucked between the gas bearing 7 and the rotary shaft 1.

When being mounted in the bearing housing 5, the gas bearing 7 may have a bearing clearance G2 between an outer peripheral surface of the rotary shaft 1 and the gas bearing 7. The bearing clearance G2 may be defined as a gap between the inner surface of the gas bearing 7 and the outer surface of the small diameter portion 12. The gas bearing 7 may be an air bearing in which air in the bearing clearance G2 supports the rotary shaft 1 in a state where the gas bearing 7 is spaced apart from the rotary shaft 1. Examples thereof may include a DU BUSH or DU DRY bearing.

Figure 8:
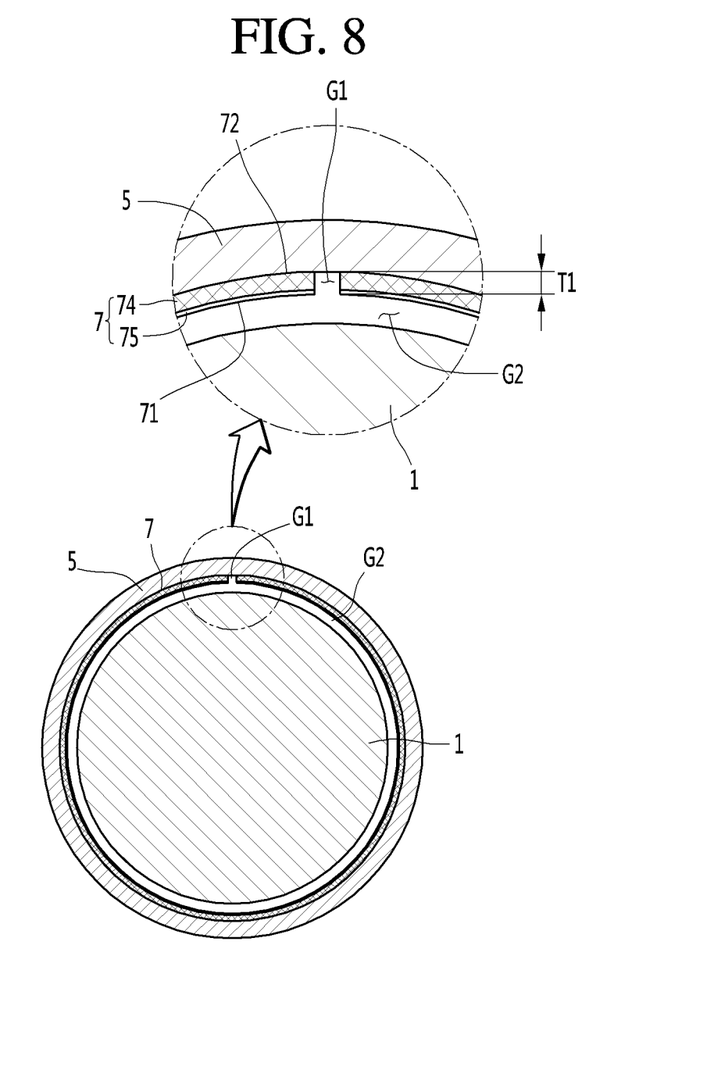
FIG. 8 is a cross-sectional view of a gas bearing according to an embodiment of the present invention when it is positioned between a rotary shaft and a bearing housing.

The gas bearing 7 may include a metal body 74 having a major arc shape in cross section and a coating layer 75 coated on the inner surface of the metal body 74.

The coating layer 75 may be made of Polytetrafluoroethylene (PTFE), diamond like carbon (DLC), lubrite, Mos2, D10, Boron nitride, ceramic powder, soap or soft metal such as copper or lead.

As shown in FIG. 7, a method of manufacturing a motor may include the steps of: applying the coating layer 75 to one surface of the metal body 74 with a plate shape (S1); forming the gas bearing 7 by rolling the metal body in an arc shape such that the one surface with the coating layer 75 is positioned inside (S2); inserting the gas bearing 7 into the bearing housing 1 (S3); and passing the rotary shaft through inside of the gas bearing (S4).

The metal body 74 may be a nickel chromium alloy in which a nickel content is greater than a chromium content. The metal body 74 may be a bush having a slit 73 formed on one side thereof, and the gas bearing 7 may be a gas bush bearing.

When the metal body 74 is in a plate shaped before being rolled in a major arc or a ring, the coating layer 73 may be applied to one surface of the metal body 74. In this case, the uniformity of the thickness of the coating layer 75 is high, and it is possible to generally facilitate management for the thickness dispersion of the gas bearing 7.

The gas bearing 7 may be a bearing in which gas, particularly air, located in the bearing clearance G2 functions as lubricant, and may be a non-contact oilless bearing that supports the rotary shaft 1 in a state of not being in contact with the rotary shaft 1.

The gas bearing 7 may be directed to the eccentric position toward the impeller 4 from the center of the rotary shaft 1. The gas bearing 7 may be closer to the impeller 4 among the rotor 2 and the impeller 4. The gas bearing 7 may be closer to the impeller 4 among the rolling bearing 6 and the impeller 4. The axial length L1 between the gas bearing 7 and the impeller 4 may be shorter than the axial length L2 between the rolling bearing 6 and the rotor 2. The gas bearing 7 may face between the center of gravity of the rotary shaft 1 and the other end 1B of the rotary shaft 1. The gas bearing 7 can be directed between the center of gravity of the rotary shaft 1 and the impeller coupling portion 16.

In the case of high-speed rotation of the impeller 4, some of air that has flowed by the impeller 4 may flow into the bearing clearance G2 in the vicinity of the bearing housing 5.

In the case of high-speed rotation of the impeller 4, the air around the bearing housing 5 may be introduced into the inside of the bearing housing 5, specifically the bearing clearance 5 between the inner surface of the gas bearing 7 and the outer peripheral surface of the rotary shaft 1, and the air in the bearing clearance G2 may lift the rotary shaft 1.

The gas bearing 7 may have an inner surface 71 that is spaced apart from the outer peripheral surface of the rotary shaft 1 and an outer surface 72 that is in contact with the gas bearing housing portion 52 formed in the bearing housing 5.

The gas bearing 7 is preferably formed to have a shape and a thickness T1 to keep the bearing clearance G2 constant and preferably has an elastic force capable of maintaining its shape when being mounted in the bearing housing 5.

The thickness T1 of the gas bearing 7 is equal to or greater than 50% of a bearing gap G1 defined between the inner surface of the bearing housing 5 and the outer surface of the rotary shaft 1 and is equal to or less than 0.3 mm.

When the thickness T1 of the gas bearing 7 is too thick, the thickness dispersion of the gas bearing 7 may be large, the bearing clearance G2 may not be constant, and the deviation may be large.

The bearing clearance G2 of the gas bearing 7 may be different according to the outer diameter of the gas bearing facing portion 14 and the thickness of the gas bearing 7 for allowing the gas bearing 7 to sufficiently perform the gas bearing function may be 0.004 to 0.0125 times the outer diameter of the gas bearing facing portion 14. When the outer diameter of the gas bearing facing portion 14 in the rotary shaft 1 is in a range of from 4 mm to 5 mm, the bearing clearance S2 may be in a range of from 0.02 mm to 0.05 mm.

It is preferable that the gas bearing 7 is formed to have a thickness to secure the bearing clearance S2.

Generally dispersion in the thickness of the gas bearing 7 that is less than 1 mm is about 3% or less. When the thickness T1 of the gas bearing 7 is too thick such as exceeds 0.3 mm, the thickness dispersion of the gas bearing 7 may be about 0.01 mm. Such thickness dispersion of 0.01 mm may correspond to 20% to 50% of the bearing clearance G2, and deviation of the performance of the gas bearing 7 may be large.

When the thickness T1 of the gas bearing 7 exceeds 0.3 mm, plastic deformation is caused when the gas bearing 7 is bent to be inserted into the inside of the bearing housing 5. In this case the gas bearing 7 may be brought into contact with the outer peripheral surface of the rotary shaft 1 without being in close contact with the inner surface of the bearing housing 5, and the portion of the gas bearing 7 where the plastic deformation is caused does not function as a gas bearing.

On the other hand, when the thickness of the gas bearing 7 is too thin, such as 0.1 mm or less, the manufacturing of the gas bearing 7 may not be easy.

Therefore, the appropriate thickness T of the gas bearing 7 may be 0.3 mm, and the preferable range thereof may be equal to or greater than 0.1 mm and equal to or less than 0.3 mm.

That is, the gas bearing 7 may be manufactured by rolling the metal body 74 with a plate shape and a thickness T of 0.3 mm or less in a major arc or an annular shape and may be inserted into and accommodated in the bearing housing 5 in the state of being rolled in the major arc or annular shape.

The gas bearing 7 may be formed with a long slit 73 (see FIG. 6) in the axial direction L on one side. The slit 73 may be is open in the radial direction of the gas bearing 7.

As described above, when the gas bearing 7 is formed by rolling the metal body 74 with a plate shape and a thickness T of 0.3 mm or less, the thickness dispersion of the gas bearing 7 may be easily managed. When the outer peripheral surface of the rotary shaft 1 and the inner peripheral surface of the bearing housing 5 are precisely machined, the bearing clearance G2 between the rotary shaft 1 and the gas bearing 7 may be managed to a desired level by a manufacturer.

The axial length L3 of the gas bearing 7 may be shorter than the distance L4 between the first retaining jaw 58 and the second retaining jaw 59.

When the axial length L3 of the gas bearing 7 is equal to or greater than a spacing distance L4 between the first and second retaining jaws 58 and 59, the gas bearing 7 may be tightly sandwiched between the first and second retaining jaws 58 and 59. In this case a part of the gas bearing 7 may be deformed convexly in the direction of the rotary shaft 1 and the bearing clearance G2 may not be constant.

On the other hand, when the axial length L3 of the gas bearing is shorter than the spacing distance L4 between the first retaining jaw 58 and the second retaining jaw 59, no part of the gas bearing 7 may be deformed convexly in the direction of the rotary shaft 1 and the gas bearing 7 may be held between the first retaining jaw 58 and the second retaining jaw 59.

The outer diameter D1 of the gas bearing 7 may be smaller than the outer diameter D2 of the rolling bearing 6. The inner diameter D3 of the gas bearing 7 may be greater than the inner diameter D4 of the rolling bearing 6. The outer diameter D2 of the rolling bearing 6 may be the outer diameter of the outer race 62 and the inner diameter D of the rolling bearing 6 may be the inner diameter of the inner race 61.

The gas bearing 7 may be a non-contact bearing that is not in contact with the rotary shaft 1 and the rolling bearing 6 may be a contact bearing in which the inner peripheral surface of the inner race 61 is in contact with the rotary shaft 1. The inner diameter D3 of the gas bearing 7 may be greater than the inner diameter D4 of the rolling bearing 6.

The thickness T1 of the gas bearing 7 may be thinner than the thickness T2 of the inner race 61 of the rolling bearing 6. The axial length L3 of the gas bearing 7 may be longer than the axial length L5 of the rolling bearing 6.

Figure 9:
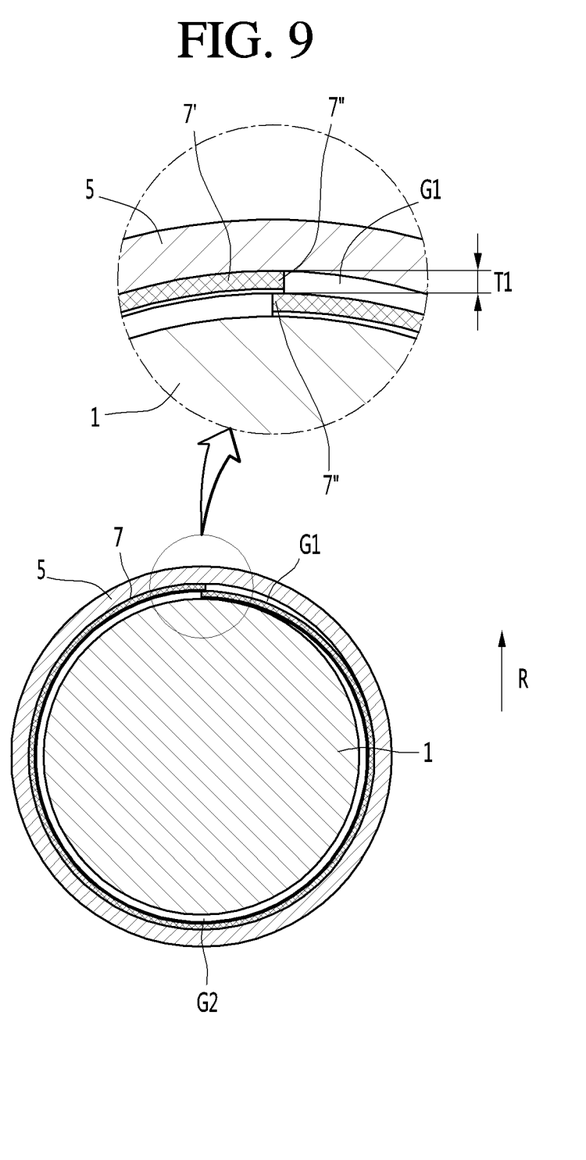
FIG. 9 is a cross-sectional view showing a comparative example of a gas bearing according to an embodiment of the present invention.

FIG. 8 is a cross-sectional view of a gas bearing according to an embodiment of the present invention when it is positioned between a rotary shaft and a bearing housing, and FIG. 9 is a cross-sectional view showing a comparative example of a gas bearing according to an embodiment of the present invention.

A comparative example of the present embodiment may be a case in which the thickness T1 of the gas bearing 7' is less than 50% of the gap G1 between the inner surface of the bearing housing 5 and the outer surface of the rotary shaft 1.

The gas bearing 7' shown in FIG. 9 may be a case in which the thickness T1 of the gas bearing 7' is too thin compared to the gap G1 between the inner surface of the bearing housing 5 and the outer peripheral surface of the rotary shaft 1.

When the thickness T1 of the gas bearing 7' is too thin as compared with the gap G1, a part of the gas bearing 7' may not be brought into close contact with the inner peripheral surface of the bearing housing 5 and may be lifted as shown in FIG. 9. The gas bearing 7' may have an overlapping portion 7" in the radial direction R.

In the comparative example shown in FIG. 9, the bearing clearance G2 between the outer peripheral surface of the rotary shaft 1 and the inner peripheral surface of the gas bearing 7' is not constant due to the overlapping portion 7" in the radial direction R, and the overlapping portion in the radial direction R may malfunction the motor.

On the other hand, in the present embodiment, since the thickness T1 of the gas bearing 7 is equal to or greater than 50% of the gap G1 between the inner surface of the bearing housing 5 and the outer peripheral surface of the rotary shaft 1, as shown in FIG. 8, a part of the gas bearing 7 does not overlap the other part and the gas bearing 7 keeps its entirety in close contact with the bearing housing 5 as much as possible so that the error of the bearing clearance G2 is minimized.

The foregoing description is merely illustrative of the technical idea of the present invention, and various changes and modifications may be made by those skilled in the art without departing from the essential characteristics of the present invention.

Accordingly, the embodiments disclosed herein are merely illustrative and are not intended to limit the technical concept of the present disclosure, and the scope of the technical idea of the present disclosure is not limited to the embodiments.

The scope of protection of the invention is to be interpreted by the following claims, all spirits within a scope equivalent will be construed as included in the scope of the present invention.

What is claimed is:

1. A motor comprising:
   a rotary shaft;
   a rotor attached to the rotary shaft;
   a stator that surrounds an outer periphery of the rotor;
   an impeller disposed on the rotary shaft and spaced apart from the rotor in an axial direction of the rotary shaft;
   a bearing housing that is disposed between the impeller and the rotor and that defines a through-hole through which the rotary shaft passes; and
   a gas bearing disposed in the bearing housing,
   wherein the bearing housing and the rotary shaft define a bearing gap between an inner surface of the bearing housing and an outer peripheral surface of the rotary shaft, and
   wherein a thickness of the gas bearing between an inner surface of the gas bearing facing the rotary shaft and an outer surface of the gas bearing facing the bearing housing is greater than or equal to 50% of the bearing gap and less than or equal to 0.3 mm.

2. The motor of claim 1, wherein the thickness of the gas bearing is greater than or equal to 0.1 mm.

3. The motor of claim 1, wherein the gas bearing comprises:
   a metal body, a cross section of the metal body having an arc shape; and
   a coating layer disposed on an inner surface of the metal body,
   wherein the rotary shaft comprises a gas bearing facing portion that faces the coating layer in a radial direction of the rotary shaft, and
   wherein the rotary shaft and the gas bearing define a bearing clearance between the gas bearing facing portion and the coating layer.

4. The motor of claim 3, wherein an outer diameter of the gas bearing facing portion is in a range from 4 mm to 5 mm, and
   wherein the bearing clearance is in a range from 0.02 mm to 0.05 mm.

5. The motor of claim 3, wherein the metal body is made of a nickel chromium alloy having a nickel content greater than a chromium content.

6. The motor of claim 1, wherein the bearing housing comprises:
   a first retaining jaw that protrudes from the inner surface of the bearing housing toward a first end of the gas bearing and that is configured to limit movement of the gas bearing in the axial direction of the rotary shaft, and
   a second retaining jaw that protrudes from the inner surface of the bearing housing toward a second end of the gas bearing spaced apart from the first end in the axial direction and that is configured to limit movement of the gas bearing in the axial direction.

7. The motor of claim 6, wherein a protrusion width of each of the first retaining jaw and the second retaining jaw with respect to the inner surface of the bearing housing is less than the thickness of the gas bearing.

8. The motor of claim 7, wherein the protrusion width of each of the first retaining jaw and the second retaining jaw is in a range from 50% to 90% of the thickness of the gas bearing.

9. The motor of claim 6, wherein a length of the gas bearing in the axial direction is less than a distance between the first retaining jaw and the second retaining jaw in the axial direction.

10. The motor of claim 1, wherein the gas bearing defines a long slit that extends along the axial direction and that is open in a radial direction toward the bearing housing.

11. The motor of claim 1, further comprising a rolling bearing that is disposed in the bearing housing, that is spaced apart from the gas bearing in the axial direction, and that is configured to support the rotary shaft.

12. The motor of claim 11, wherein the rolling bearing comprises an inner race that faces the rotary shaft, and
   wherein the thickness of the gas bearing is less than a thickness of the inner race of the rolling bearing.

13. The motor of claim 11, wherein a length of the gas bearing in the axial direction is greater than a length of the rolling bearing in the axial direction.

14. A motor comprising:
   a rotary shaft;
   a rotor attached to the rotary shaft;
   a stator that surrounds an outer periphery of the rotor;
   an impeller disposed on the rotary shaft and spaced apart from the rotor in an axial direction of the rotary shaft;
   a bearing housing that is disposed between the impeller and the rotor and that defines a through-hole through which the rotary shaft passes;
   a gas bearing disposed in the bearing housing, the gas bearing having an inner peripheral surface spaced apart from an outer peripheral surface of the rotary shaft; and
   a rolling bearing that is disposed in the bearing housing, that is spaced apart from the gas bearing in the axial direction, and that is configured to support the rotary shaft, the rolling bearing comprising an inner race that faces the rotary shaft,
   wherein a thickness of the gas bearing between an inner surface of the gas bearing facing the rotary shaft and an outer surface of the gas bearing facing the bearing housing is less than a thickness of the inner race of the rolling bearing.

15. The motor of claim 14, wherein the bearing housing and the rotary shaft define a bearing gap between an inner surface of the bearing housing and the outer peripheral surface of the rotary shaft, and
   wherein the thickness of the gas bearing is greater than or equal to 50% of the bearing gap.

16. The motor of claim 14, wherein the thickness of the gas bearing is in a range from 0.1 mm to 0.3 mm.

17. The motor of claim 14, wherein a length of the gas bearing in the axial direction is greater than a length of the rolling bearing in the axial direction.

18. The motor of claim 14, wherein the gas bearing comprises:
   a metal body, a cross section of the metal body having an arc shape; and
   a coating layer disposed on an inner surface of the metal body,
   wherein the rotary shaft comprises a gas bearing facing portion that faces the coating layer in a radial direction,
   wherein the rotary shaft and the gas bearing define a bearing clearance between the gas bearing facing portion and the coating layer, wherein an outer diameter of the gas bearing facing portion is in a range from 4 mm to 5 mm, and wherein the bearing clearance is in a range from 0.02 mm to 0.05 mm.

19. A method of manufacturing a motor, the motor including a rotary shaft and a bearing housing, the method comprising:

providing a metal body made of a nickel chromium alloy having a nickel content greater than a chromium content, the metal body having a plate shape;

applying a coating layer to one surface of the metal body;

rolling the metal body in an arc shape to define a gas bearing having the coating layer positioned inside of the gas bearing;

inserting the gas bearing into a gas bearing housing portion inside the bearing housing; and passing the rotary shaft through an inside of the gas bearing disposed inside the bearing housing, wherein the bearing housing and the rotary shaft define a bearing gap between an inner surface of the bearing housing and an outer peripheral surface of the rotary shaft, and wherein a thickness of the gas bearing between an inner surface of the gas bearing facing the rotary shaft and an outer surface of the gas bearing facing the bearing housing is equal to or greater than 50% of the bearing gap and less than or equal to 0.3 mm.

20. The method of claim 19, wherein the thickness of the gas bearing is greater than or equal to 0.1 mm.

\* \* \* \* \*